United States Patent Office 2,864,727
Patented Dec. 16, 1958

2,864,727

RODENT REPELLENT BINDER CORD COMPRISING NAPHTHENIC ACID STABILIZED QUINALDINE

Pranas Jucaitis, Chicago, Ill., assignor, by mesne assignments, to International Harvester Company, Chicago, Ill., a corporation of New Jersey No Drawing. Application December 23, 1954
Serial No. 477,411

1 Claim. (Cl. 117—138.5)

This invention relates to rodent repellents. More in particular, this invention relates to cord or twine, having rodent-repelling characteristics, for use in binding materials which may have some attraction to rodents.

For example, in the binding of hay, straw or grain, and the like, the agricultural industry has experienced much damage due to rats or mice cutting the binding twine or cord, which not only results in loss of products but also substantially increases the labor necessary in handling broken bales.

The prime object of this invention is to provide a treated cord or twine having the property of effectively repelling rodents from attacking the cord or twine for long periods of time.

Another object of this invention is to provide an improved cord or twine treated to impart effective rodent-repelling properties, which is resistant to mold deterioration and does not harm the product bound by the cord or twine.

Still another object of this invention is to provide an improved cord or twine treated to impart effective rodent-repelling properties, wherein the repellent agents are suitable for incorporation into ordinary twine or cord manufacturing operations.

These and other objects and advantages of the invention will become apparent from the following description of preferred embodiments and the appended claim.

As an approach in the development of a solution to the problem, many factors were considered in addition to the usual cost considerations, ease of manufacture, transportation, use and handling as well as resistance to fungous deterioration.

Generally speaking, rodenticides do not present a solution to the problem, for even though such rodenticides are useful in causing death to rodents, death usually occurs after the damage to the twine or cord bound material. The objective is, therefore, to repel the rodents, either by the sense of taste or odor, from causing damage in the first instance as distinguished from causing death after the occurrence of damage. Therefore, much consideration was given to the psychological characteristics of rodents, particularly that of rats and mice. It is not known to any degree of exactness as to the underlying cause or causes which motivates rats or mice to cut binder cord. In developing suitable means for testing various compounds or compositions to evaluate statistically their respective repellency, the following psychological factors were considered:

(1) Necessity of abrading material for grinding continuously growing incisor teeth.
(2) Heredity
(3) Hunger motivation
(4) Thirst
(5) Chewing for pleasure
(6) Claustrophobia
(7) Sex motivation
(8) Ordinary mischievousness
(9) Age
(10) Observation Having in mind the above factors, an experimental test cage was designed and built specifically for the testing and statistically evaluating of baler cord treated with rodent-repelling compositions. The dimensions of the cage are 6' x 1' x 1', comprising six compartments each 1' x 1' x 1' connected together serially with a partition separating each compartment from its adjacent compartment. Each partition between adjacent compartments contains a pair of doors held in closed position by means of springs attached to the cord under test. The cord under test is held in tension by a weight, and is positioned to be completely accessible to the animal. Thus, when the animal cuts the cord, the weight drops and the spring opens a door between two compartments. The sides and top of the entire cage are made of transparent material for full observation. The bottom of each compartment is made of wire screen. Along the top of the cage are fluorescent lights which serve to obscure the observer from the animal and to provide illumination for photography. The entrance and exit doors are operated manually, while the doors of the five partitions are operated by action of the animal on the cord. Electric timing devices were connected to the apparatus to record the cutting action of the animals to facilitate statistical evaluation of the test results.

The working hypothesis for testing repellents was to train rats to cut binder cord through hunger motivation. Thus, if rats were first trained to cut untreated cord through associating the act of cutting with a reward of food, then if the rats refused to cut a repellent-treated cord, or at least were deterred from immediately cutting the cord, a degree of repellency exists. Rats selected for training quickly learned that if they cut the cord, a doorway to the next compartment opened wherein they would find a small morsel of food as well as another cord positioned for subsequent cutting, admitting them to the following compartment, and so on. Since each partition is provided with two doors, one of the two associated cords may be repellent treated, giving the animal a choice of two cords to cut. Thus neither, one, or both cords under test in a selected compartment could be treated with a repellent.

It was found that rats trained as outlined above became so highly motivated that they would cut most cords treated with prospective repellent compounds or compositions, although in some instances their cutting speed was markedly reduced, while in other instances the animals refused to cut the cord at all. Also it was found that a given repellent may be an excellent repellent with respect to one group of rats, while it was only mildly effective against another group. This suggested that a good repellent may consist of more than one ingredient.

Now it is apparent that if highly motivated animals refuse, or at least are markedly deterred, to cut treated cord, then wild and untrained animals, in all probability, would not cut such cord. Tests with wild and untrained rats indicated that such supposition is confirmed in fact.

In testing twine or cord treated with numerous compounds or compositions, it was found that heterocyclic compounds having at least one nitrogen atom in the ring were notably good rodent repellents. For example, it was found that cord treated with quinaldine compound having the following structural formula was excellent in repelling rodents.

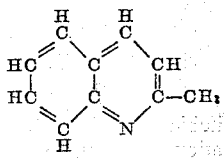

Quinaldine

It will be noted that the above-described quinaldine compound has one nitrogen atom disposed in a heterocyclic ring, the remaining atoms being carbon.

While the above-described quinaldine compound exhibited excellent rodent-repelling properties, it was found that the aging qualities with respect to effectiveness of repellency were greatly enhanced in some instances by the additional component of an organic acid, particularly in quantities sufficient to permit the resulting composition to be slightly acidic. Presumably, the organic acid reacts with the nitrogen, forming salts which inhibited action by carbon dioxide of the atmosphere.

By way of illustration, the following specific example of the invention is described which proved to be an excellent repelent having good aging characteristics.

*Example 1*

Binder cord treated to contain up to 2% by weight of quinaldine and up to 2% by weight of naphthenic acids.

In the manufacture of twine or cord, particularly that of sisal base, an oil (usually referred to as twine oil) of light viscosity is usually used. The repellent compound or composition may conveniently be dissolved or dispersed in the oil, so that a uniform disposition of the repellent on the cord or twine is obtained. As an alternative, finished cord may be treated with the repellent by a suitable impregnating or coating operation. In the latter method, a suitable vehicle may be necessary in some instances. However, in commercial scale twine and cord production, it was found most convenient and economical to add the repellent in the oil required for cord manufacture.

While a specific example of the invention is disclosed herein, the invention is not limited solely thereto, as the precise proportions of the materials utilized may be varied, and other members of this class of rodent repellents may be employed without departing from the spirit and scope of the invention as defined in the appended claim.

I claim:

A binder cord having incorporated therein a rodent-repelling composition consisting of an effective amount up to 2% by weight of quinaldine and up to 2% by weight of naphthenic acids.

References Cited in the file of this patent

UNITED STATES PATENTS

| | | |
|---|---|---|
| 2,001,108 | Parker | May 14, 1935 |
| 2,578,595 | Ralston et al. | Dec. 11, 1951 |

OTHER REFERENCES

Smith et al.: Ind. Eng. Chem., vol. 18, No. 7, July 1926, pp. 691–694.

Caldwell et al.: J. A. P. A., vol. 23, No. 1, January 1934, pp. 7–9.

Bellack et al.: Nat'l. Res. Council's "Relationship Between Chem. Structure and Rat Repellency," 1953, pp. 49, 53, 57, 70 and 105, 108–109.

Merck Index, 6th ed., 1952, Merck and Co., Rahway, N. J., p. 816.